US005925440A

United States Patent [19]

Farag et al.

[11] Patent Number: 5,925,440

[45] Date of Patent: *Jul. 20, 1999

[54] REMOVABLE SCRATCH-OFF COATING

[75] Inventors: Ashraf T. Farag, Lula; James J. Carides, Lawrenceville, both of Ga.

[73] Assignee: Dittler Brothers Incorporated, Atlanta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,328

[22] Filed: Jun. 24, 1997

[51] Int. Cl.$^{6}$ .................................................. B32B 9/00

[52] U.S. Cl. ............................ 428/195; 428/29; 428/192; 428/194; 428/207; 428/209; 428/211; 428/323; 428/327; 428/403; 428/457; 283/90; 283/95; 283/102; 283/108; 273/139; 273/269

[58] Field of Search ............................ 428/29, 195, 211, 428/323, 327, 403, 192, 194, 207, 209, 457; 283/95, 102, 96, 903, 100, 108, 901; 273/139, 269; 156/277, 289

[56] References Cited

U.S. PATENT DOCUMENTS 5,569,512 10/1996 Brawner et al. .......................... 428/29

*Primary Examiner*—William A. Krynski
*Assistant Examiner*—Abraham Bahta
*Attorney, Agent, or Firm*—Marcus Delgado, Esq.; Dean W. Russell, Esq.; Kilpatrick Stockton LLP

[57] ABSTRACT

A card is disclosed that incorporates a removable scratch-off coating to hide printed symbols. The card is constructed so that the scratch-off coating is selectively retained by the card, in the form of symbols, or as a background for symbols, when the scratch-off coating is removed. The selective retention of scratch-off coating material to the card is accomplished by incorporating into the card, between the substrate and the scratch-off coating, a clear release coat patterned to form symbols. When the scratch-off coating material is applied to the card during construction, it either adheres directly to the substrate in the form of symbols, or it adheres to the substrate in the background for the symbols, depending on how the release coat is applied. When a player rubs the scratch-off coating material, it releases from the release coat and remains adhered to the substrate to create either symbols or the background for symbols.

22 Claims, 3 Drawing Sheets

REMOVABLE SCRATCH-OFF COATING

FIELD OF THE INVENTION

The present invention relates to removable scratch-off coatings and items that incorporate scratch-off coatings to obscure images from view.

BACKGROUND OF THE INVENTION

Many instant-win lottery cards are coated in one or more regions by scratch-off coating compositions in order to hide symbols that comprise game indicia. When a purchaser of such a card scratches off the coating, he or she reveals the symbols and learns the results of the game. Instant-win tickets, promotional labels and other games similarly incorporate scratch-off coatings to hide symbols.

Instant-win lottery cards, like other games that incorporate scratch-off coatings, typically are layered with a complex array of coatings of varying compositions. The complex construction provides a card that is both durable and relatively secure from tampering. U.S. patent application Ser. No. 08/407,185 (which application is incorporated herein in its entirety by this reference) discloses several arrays of coatings that a card can incorporate.

The substrate, or base, of many instant-win lottery cards is cut from cellulosic board stock. A metallic foil is then laminated to the board stock. The metallic foil is coated with a primer to minimize oxidation and to provide a surface that is receptive to ink. After symbols have been printed atop the primer in pigmented ink, a sealant is frequently applied over them to protect the printed symbols. A scratch-off coating, which typically is comprised of an opaque metallic latex, is applied over the printed symbols and sealant to obscure the symbols from view. To facilitate removal of the latex from the card, existing cards often further include at least one "release" coat interposed between the scratch-off coating and ink sealant.

In addition to providing a durable substrate for the production of instant-win cards, a cellulosic board stock and foil combination provides a level of opacity and impermeability that is important to the security of the card. The board stock and foil combination inhibits unscrupulous players from viewing the printed symbols by examining the ticket before a light source, a process known as candling. The non-porous foil also protects the card from chemical tampering by preventing unscrupulous players from chemically wicking the hidden symbols to the underside of the substrate where they might become visible.

While existing foil-based cards may be durable and secure, they are difficult and expensive to manufacture because they are constructed of numerous coatings and layers. Many times these coatings and layers are comprised of specialty chemicals to ensure that the layers are compatible with and adhere to one another. These specialty chemicals are often very expensive. The foil in foil-based cards is another significant raw material expense, and it adds an element of complexity to the manufacturing process. Foil-based cards also are difficult to recycle because the metal foil interferes with conventional paper recycling processes. The foil further prevents electrostatic printing techniques from being employed, reducing the variety of graphics available for use. The use of ink to print the symbols is also problematic. Ink printing requires that two additional processing steps be incorporated into the card manufacturing process, one printing step and another sealant step. Each of these steps substantially increases the time and expense required to manufacture existing cards.

An instant-win card that is different from those discussed above was recently introduced. This card appears to omit foil from its base, and instead to incorporate a water-based black coating over the conventional board stock. The black coating is approximately one micron thick and comprised of carbon, chlorine, and calcium. This black coating is believed to be either identical or virtually identical visually to the composition of the ink used to print the hidden images on the card thus diminishing the possibility that an unscrupulous player could distinguish the hidden images from the coating through candling. To contrast the hidden images from the black base coating, and to receive more readily printed symbols, the card interposes a lighter color coating between them. This card however, like others discussed above, is complex.

SUMMARY OF THE INVENTION

Cards produced according to the present invention are simplified greatly because pigmented ink is not used to print the hidden symbols. It thus is not necessary to disguise the ink or physically to protect the ink from tampering processes. In one embodiment, the card is constructed so that the scratch-off coating is selectively retained by the card, in the form of symbols, when the bulk of the scratch-off coating material is rubbed off the card. The scratch-off coating material effectively becomes the medium used to visualize legible symbols. The selective retention of scratch-off coating material to the card in the form of symbols is accomplished by incorporating into the card, between the substrate and the scratch-off coating, a clear release coat having voids in it in the form of symbols. During card construction, when the scratch-off coating material is applied to the card over the release coat, it adheres directly to the substrate through the voids in the release coat in the form of symbols. When a player rubs the scratch-off coating material, it releases from the areas where the release coat is applied and remains adhered to the substrate in the form of symbols where the release coat is not applied.

The card also can be constructed so that the release coat is applied to the card in the form of the desired symbols. When a player rubs the scratch-off coating material, the scratch-off coating material is released selectively from the card where the symbols have been printed with the release coat. A portion of the scratch-off coating material that is applied directly to the substrate is retained by the card at the interface between the card and the scratch-off coating. In such a construction the scratch-off coating material becomes the background for the symbols and, because the scratch-off coating material separates from the card in the form of symbols where the clear release coat is applied, the substrate to which the release coat is applied becomes the medium through which legible symbols appear.

Because the medium that forms the symbols is typically either the scratch-off coating material or substrate, and because the release coat that patterns the symbols is typically clear, an unscrupulous player is less likely by candling to discern the symbols in an item produced according to the present invention. Moreover, because pigmented ink is not employed to print the hidden symbols, unscrupulous players are less able to compromise the game prematurely through chemical wicking. Lastly, because the substrate or scratch-off coating material can double as the printing medium the construction of the card and the complexity of the coatings and layers is greatly simplified.

It is an object of the present invention, therefore, to construct a simple instant-win game that incorporates a removable scratch-off coating that does not contain a complex array of layers and coatings.

It is also an object of the present invention to construct an instant-win card that incorporates a removable scratch-off coating that inhibits candling and other means of tampering that prematurely compromise the game.

It is a further object of this invention to overcome the need for pigmented ink to produce legible symbols in a game card.

A still further object of this invention is to overcome the need to use excessive amounts of specialty chemicals and compositions in layers and coatings of game cards, and to increase the number of compositions that can be incorporated suitably into the layers and coatings of cards.

Other aspects, objects, and advantages of the invention will become apparent to those skilled in the art upon reference to this specification.

DRAWINGS

DETAILED DISCUSSION

Figure 1:
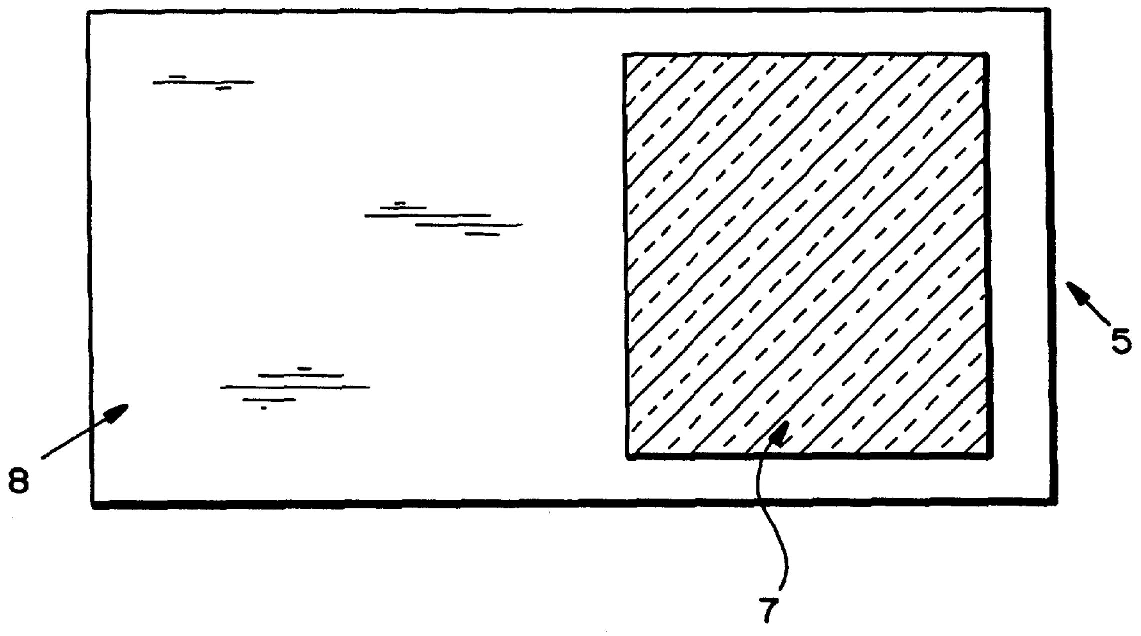
FIG. 1 is a top plan view of a card of the present invention.

FIG. 1 illustrates a card 5 constructed according to one embodiment of the present invention. Card 5, configured as an instant-win lottery card, is divided into secure and unsecure areas 7 and 8 respectively. Promotional material to which the player is first exposed typically is printed in unsecure area 8. Promotional material also may be printed atop secure area 7. Legible symbols that inform a player of the results of the game are hidden by the scratch-off coating material contained in the secure area 7 of card 5. A player reveals the hidden symbols in secure area 7 by removing the scratch-off coating material.

Figure 2:
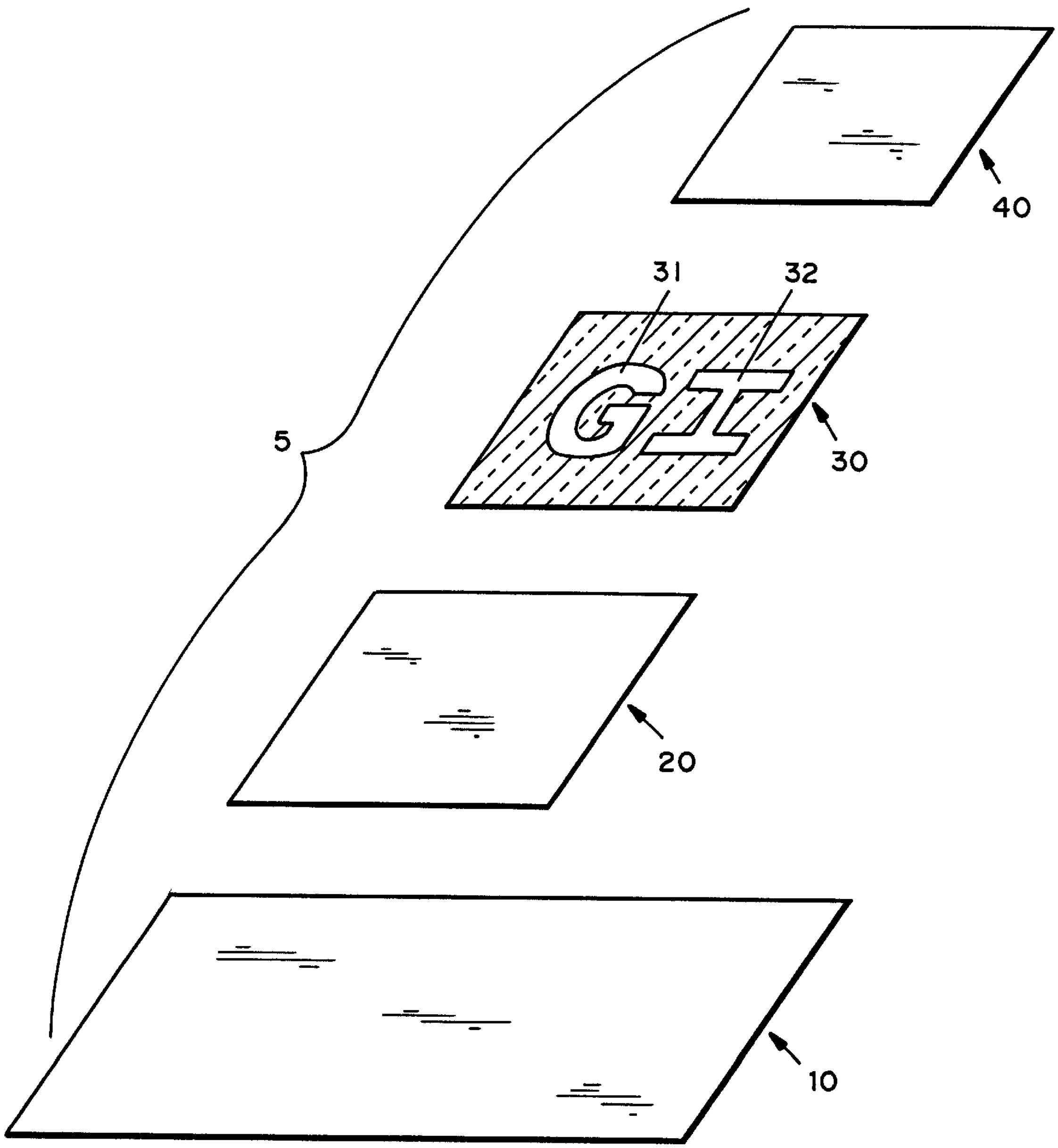
FIG. 2 is an exploded perspective view of a card of the present invention showing the layers incorporated into the card, wherein voids in the release coat are in the form of symbols to produce a negative pattern of symbols.

As illustrated in FIG. 2, card 5 is constructed of several layers and coatings. Layer 10 forms the substrate, or base ply, of card 5. Eight or ten point board stock typically is used as the base ply in instant-win lottery cards and because of its durability and structural rigidity is suitable for use as the substrate in cards of the present invention. Durability and structural rigidity are not critical to the invention, however, and lighter paper such as 60 lb. paper also can be employed. Indeed, because the scratch-off coating does not have to be as thick as the scratch-off coating in other cards (as will be discussed later in this specification), lighter and less expensive substrates can be used readily with this invention. Although foil conceivably could be laminated to the board stock, card 5 of the present invention omits foil so that it is simpler and more readily recycled. Indeed, base layer 10 itself may be constructed of recycled fibers. Alternatively, other materials, both natural and synthetic, can be used for the substrate without departing from the scope or spirit of this invention. Any substrate material can be employed that provides a surface that can retain the layers applied to the card and that provides the rigidity and strength to withstand forces applied to the card during processing, handling, and use of the item or game.

Much commercially available substrate material is not suitably colored to receive printed symbols and to provide a visible contrast with such symbols. In addition, the rough texture of most commercially available board stock makes it ill-suited to receive printed symbols directly, especially symbols that are finely detailed and defined. Moreover, commercial board stock and other substrate materials may be incompatible with certain printing media. A primer may be employed to overcome such problems. In FIG. 2 a primer, shown as layer 20, is coated over the substrate to receive printed symbols more readily and to create a better contrast with which to view printed symbols. A suitable primer is adapted to adhere to base ply 10, to receive the scratch-off coating material composition, and to resist separating from the base ply 10 when the scratch-off coating material is removed. In addition, the primer must be capable of receiving the composition of release coat 30 that is also applied to the primer.

Many compositions and types of materials are suitable for use as a primer. The primer may be a sheet of material adhered to the base ply, or it can be a coating chemically or otherwise applied over the base ply. Many compositions of commercially known and available coatings are suitable for use as primers in cards of the present invention, including primers that are used in existing cards. A suitable composition of primer 20, that can be applied to a cellulosic substrate, is a vinyl chloride resin dissolved in acetate solvent with titanium dioxide pigment. Other pigments or colorants can be added to the primer to impart the desired color to the primer, to best contrast the primer with the scratch-off coating material.

Release coat 30 is applied over primer 20 so that a player can rub scratch-off coating 40 from the card where release coat 30 is applied. In the embodiment shown in FIG. 2 release coat 30 also acts as the negative pattern through which scratch-off coating material is adhered selectively to the primer 20 in the form of predetermined symbols. Voids in release coat 30 in the form of symbols dictate the symbols that appear on the card 5 when a player removes scratch-off coating 40. Exemplary voids 31 and 32, in the form of symbols "G" and "I", are shown in the release coat 30 of card 5. When scratch-off coating is applied to card 5 during construction, it adheres to the release coat 30, but also adheres directly to primer 20 at voids 31 and 32 in the form of the symbols "G" and "I." When the scratch-off coating 40 is separated from the release coat 30 by rubbing, the material from scratch-off coating 40 that was adhered to the primer 20 remains adhered thereto at the interface between the scratch-off coating and the primer, revealing imprinted symbols "G" and "I."

Figure 3:
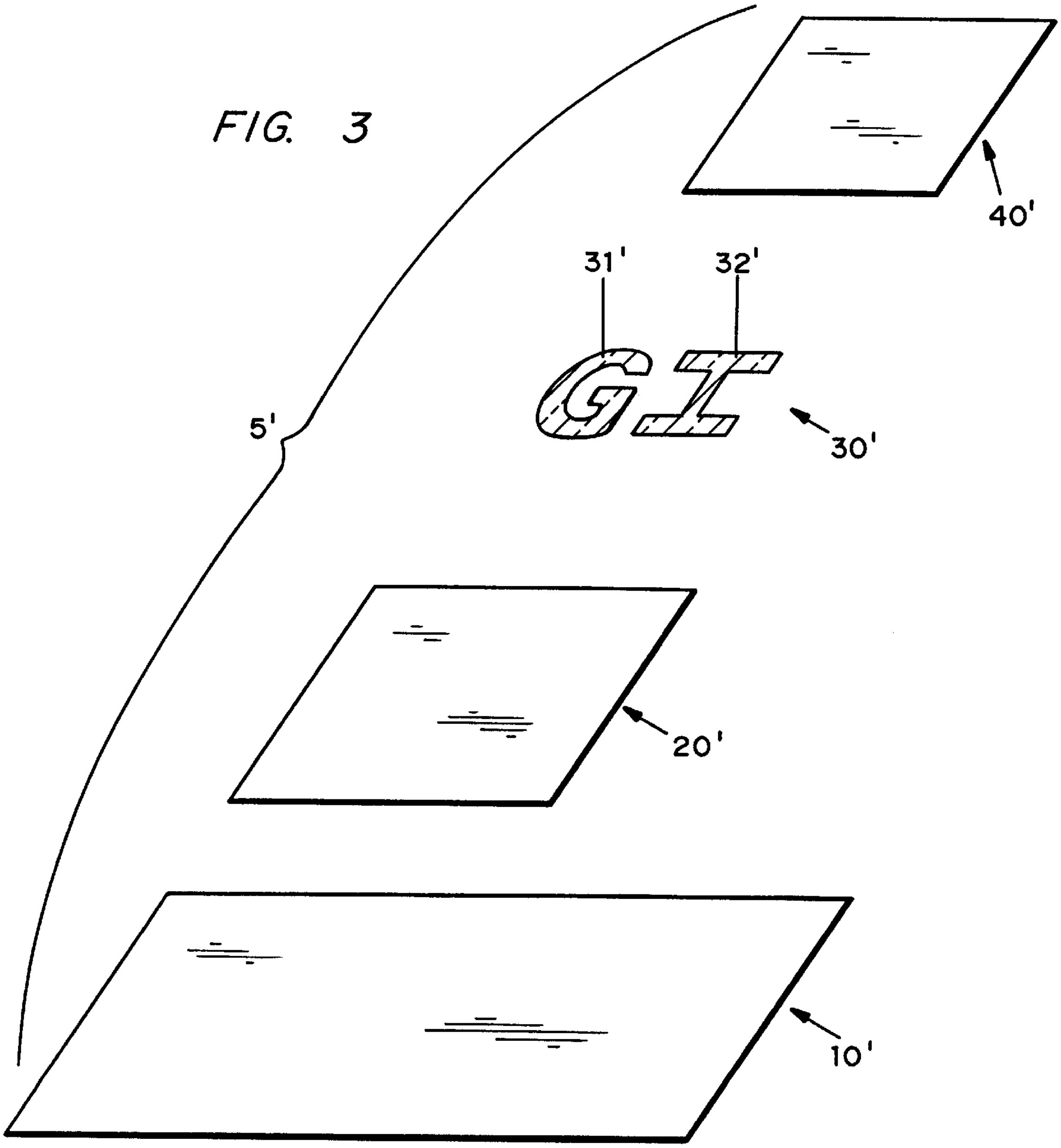
FIG. 3 is an exploded perspective view of a card of the present invention showing the layers incorporated into the card, wherein the release coat is in the form of symbols to produce a positive pattern of symbols.

In another embodiment of the invention, card 5' shown in FIG. 3, the release coat 30' is applied directly to the primer 20' in the form of the symbols that comprise the game indicia. When rubbed, the scratch-off coating 40' that is applied over the release coat 30' completely separates from the card where the symbols have been imprinted by the release coat. A thin layer 31' and 32' of the scratch-off coating material remains bonded to the card in the area surrounding the symbols 31' and 32', thereby creating a background for the symbols G and I formed by the primer.

While it is possible to use. a tinted or opaque release coat, release coat 30 usually is clear so that it does not interfere with the contrast between primer 20 and the scratch-off coating material that adheres to the primer to create symbols. The clarity of the release coat also inhibits optical compromise through candling, because one cannot visibly distinguish voids 31 and 32 where release coat 30 is not applied from the clear release coat 30 itself Release coat 30 can be comprised of many different compositions that are known and commercially available. Any release composition that adheres to primer 20 more than it adheres to the scratch-off coating 40 is suitable because it permits a player to rub the scratch-off coating 40 from card 5 while the release composition is retained by primer 20. Compositions of alcohol soluble polyamide resins and zinc stearate are frequently employed as release compositions in instant-win lottery cards and are especially suitable for cards of the present invention when primer 20 is a vinyl chride resin dissolved in acetate solvent, and the scratch-off coating composition is a metallic latex.

Another release coat composition that can be used when primer 20 is a vinyl chloride resin dissolved in acetate solvent and the scratch-off coating composition is a metallic latex is a varnish that is cured by ultraviolet radiation. Because this type of coating is not air-dried it remains unfixed until exposed to ultraviolet radiation. Exemplary compositions for such a release coating include (by weight) approximately 30–70% monomer, 5–40% epoxy oligomer, and, if appropriate, 3–12% benzophenone and various anti-foamants, flow/leveling agents, photo-initiators, and synergists. Because these components cross-link when exposed to ultraviolet radiation, this alternative release coating typically cures to a hard and durable finish.

Applied atop release coat 30 is scratch-off coating 40. The composition of the scratch-off coating 40 is adapted to adhere to the release coat composition, yet to separate from the release coat composition when scratched or rubbed off. The scratch-off coating material also is adapted to remain at least partly adhered to the primer 20 when the scratch-off coating is scratched or rubbed. The composition of the scratch-off coat 40 also should be tinted or colored suitably to provide a visible contrast between the scratch-off coating material that remains adhered to primer 20 after the scratch-off coating has been rubbed or scratched off If the primer 20 is a light color, for example, dark colors can be incorporated into the scratch-off coating composition for beneficial visual effects.

Although many scratch-off coating materials are suitable for use in the present invention, latex based compositions laced with metallic particles such as aluminum, copper, or bronze have proven especially effective for use with the release coat compositions disclosed herein. Latex based compositions also have proven effective to adhere, in the form of discreet and finely defined symbols, to primer compositions of vinyl chloride resins dissolved in acetate solvent. Latex based compositions are used as scratch-off coating materials in many applications and are readily available for use.

Many other scratch-off coating materials can be used with cards of the present invention. Indeed, because of the minimal amount of coating that must be applied to cards of the present invention, many coating materials that would not be suitable for other cards are suitable for cards of the present invention. In contrast to scratch-off coatings in many cards, which generally must be completely opaque to hide the symbols printed to the card, the scratch-off coating of the present invention can be very thin and generally needs only to cancel the reflectivity of the release coat in order to hide the symbols incorporated into the card. Mat-like finishes are especially suitable for application to reflective release coats, because they tend to cancel reflectivity efficiently. Any composition that remains bound to the primer at its interface with the primer, releases from the release coat, and can be scratched off a card is generally suitable for use as a scratch-off coating material in cards of the present invention.

Cards 5 and 5' in FIGS. 2 and 3 form only two embodiments of the present invention, and many other items can be constructed according to the present invention. Indeed, while much of the foregoing discussion relates to instant-win lottery cards, the invention can be practiced with any item or game in which a scratch-off coating is incorporated to hide symbols printed thereon. The foregoing is provided only for purposes of illustrating, explaining, and describing embodiments of the present invention. Modifications and adaptations to these embodiments will be apparent to those skilled in the art and may be made without departing from the scope or spirit of this invention.

What is claimed is:

1. An item comprising:

a. a substrate surface;

b. a release coat applied atop the surface in the form of at least one symbol; and c. a coating material applied atop the surface and the release coat, the coating material releasing from the release coat and adhering partly to the surface when a person removes the coating material to reveal the symbol.

2. The item of claim 1 wherein the item is a game card.

3. The game card of claim 2 in which the surface is one side of a sheet of cellulosic material having two sides.

4. The game card of claim 2 further comprising a primer coat applied to the surface.

5. The game card of claim 4 in which the primer coat comprises a vinyl chloride resin dissolved in acetate solvent.

6. The game card of claim 4 in which the release coat comprises an alcohol soluble polyamide resin and zinc stearate.

7. The game card of claim 5 in which the release coat comprises approximately 30–70% monomer, and 5–40% epoxy oligomer, by weight.

8. The game card of claim 7 in which the release coat further comprises 3–12% benzophenone by weight.

9. The game card of claim 5 in which the scratch-off coating material comprises a latex laced with metallic particles.

10. A card comprising:

a substrate;

a release coat applied atop the substrate in the form of a symbol;

a coating material applied to the substrate and the release coat, the coating material releasing from the release coat and adhering partly to the substrate when a person removes the coating material to reveal the symbol.

11. The card of claim 10 further comprising a primer coat applied to the substrate beneath the release coat and the coating material.

12. The card of claim 11 in which the primer coat comprises a vinyl chloride resin dissolved in acetate solvent.

13. The card of claim 10 wherein the card is an instant-win lottery card.

14. An item comprising:

a substrate surface;

a release coat applied atop the surface such that voids uncoated portions within the release coat define at least one symbol; and a coating material applied atop the surface and the release coat, the coating material releasing from the release coat and adhering partly to the surface when a person removes the coating material to reveal the symbol.

15. The item of claim 14, wherein the item is a game card.

16. The game card of claim 14, in which the surface is one side of a sheet of cellulosic material having two sides.

17. The game card of claim 14, further comprising a primer coat applied to the surface.

18. The game card of claim 17, in which the primer coat comprises a vinyl chloride resin dissolved in acetate solvent.

19. The game card of claim 18, in which the release coat comprises an alcohol soluble polyamide resin and zinc stearate.

20. The game card of claim 18, in which the release coat comprises approximately 30–70% monomer, and 5–40% epoxy oligomer, by weight.

21. The game card of claim 20, in which the release coat further comprises 3–12% benzophenone by weight.

22. The game card of claim 18, in which the scratch-off coating material comprises a latex laced with metallic particles.

* * * * *

UNITED STATES PATENT AND TRADEMARK OFFICE

CERTIFICATE OF CORRECTION

PATENT NO. : 5,925,440

DATED : July 20, 1999

INVENTOR(S) : Ashraf T. Farag et al.

It is certified that error appears in the above-indentified patent and that said Letters Patent is hereby corrected as shown below:

Column 5, line 9 delete "chride" and insert --chloride--

Column 5, line 37, after "off" insert --.--

Column 6, line 65, claim 14 delete "voids"

Signed and Sealed this

First Day of February, 2000

Attest:

Q. TODD DICKINSON

*Attesting Officer*

*Acting Commissioner of Patents and Trademarks*